Figure 1:
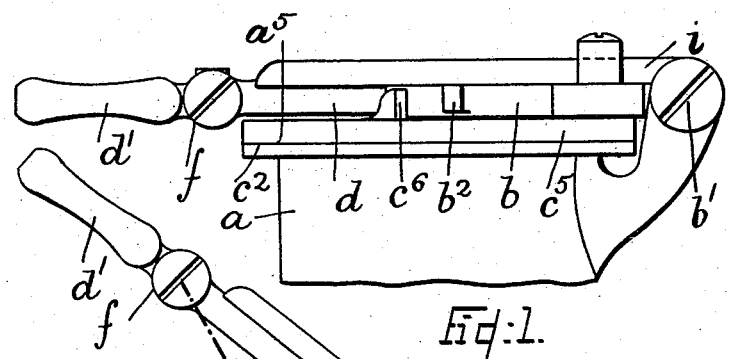

W. V. GILBERT.
CLOSING MECHANISM AND THE LIKE.
APPLICATION FILED JUNE 10, 1911.

1,024,987.

Patented Apr. 30, 1912.
6 SHEETS—SHEET 1.

Witnesses
F. C. Barry
Edw. M. Callaghan

Inventor
Walter Villa Gilbert
By Munn & Co.
Attorneys

W. V. GILBERT.
CLOSING MECHANISM AND THE LIKE.
APPLICATION FILED JUNE 10, 1911.
1,024,987.
Patented Apr. 30, 1912.
6 SHEETS—SHEET 2.
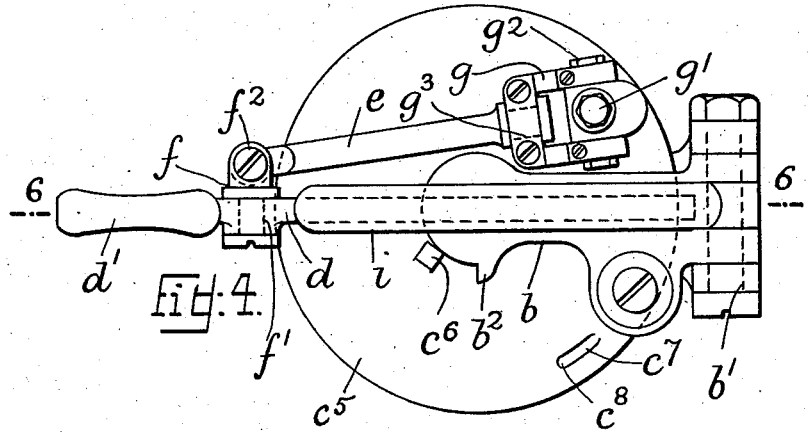
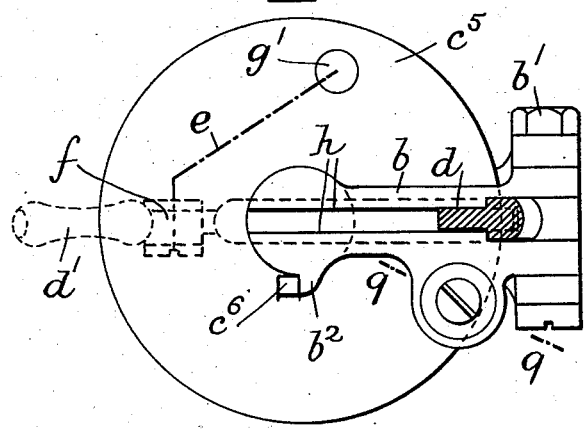
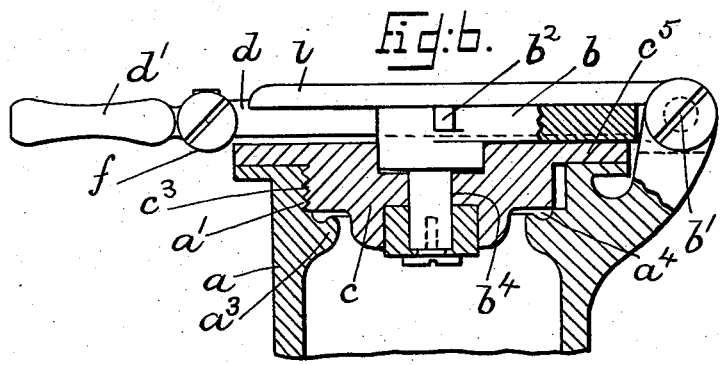
Witnesses
Y. C. Barry
Edw. M. Callaghan
Inventor
Walter Villa Gilbert
By Munn & Co.
Attorneys W. V. GILBERT.
CLOSING MECHANISM AND THE LIKE.
APPLICATION FILED JUNE 10, 1911.
1,024,987.
Patented Apr. 30, 1912.
6 SHEETS—SHEET 3.
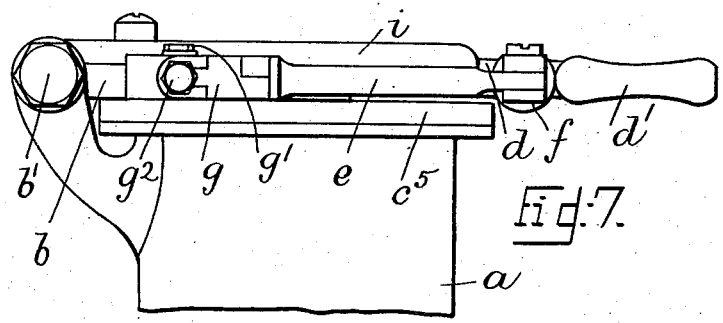
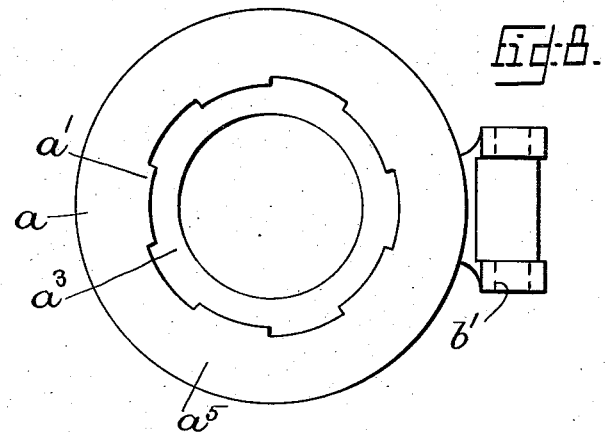
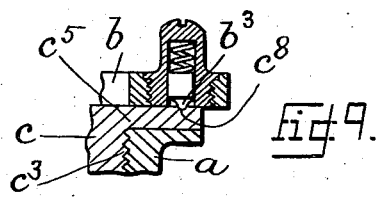
Witnesses
F. C. Barry
Edw. M. Callaghan
Inventor
Walter Villa Gilbert
By Munn & Co.
Attorneys W. V. GILBERT.
CLOSING MECHANISM AND THE LIKE.
APPLICATION FILED JUNE 10, 1911.
1,024,987.
Patented Apr. 30, 1912.
6 SHEETS—SHEET 4.
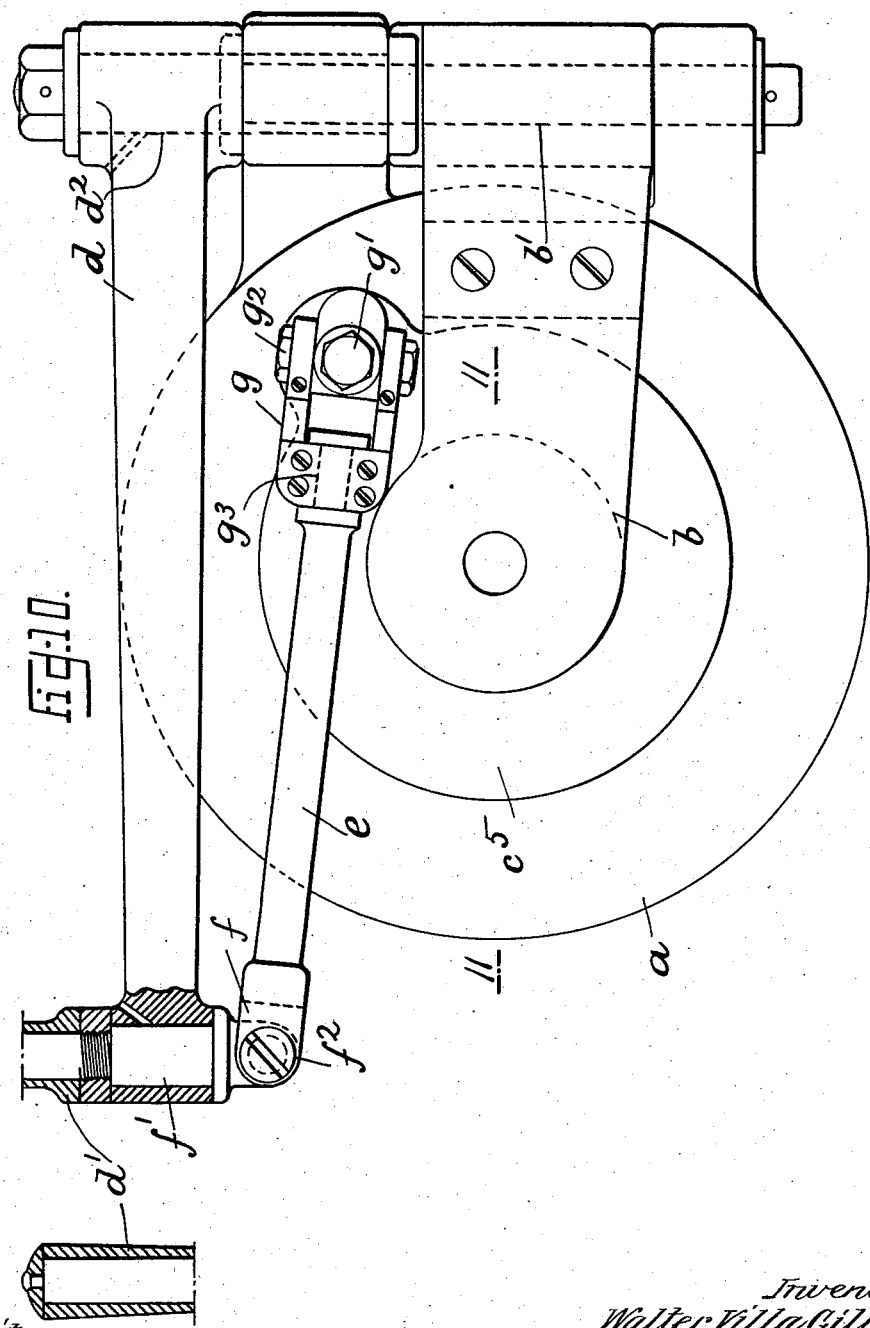
Witnesses
F. C. Barry
Edw. M. Callaghan
Inventor
Walter Villa Gilbert
By Munn & Co.
Attorneys

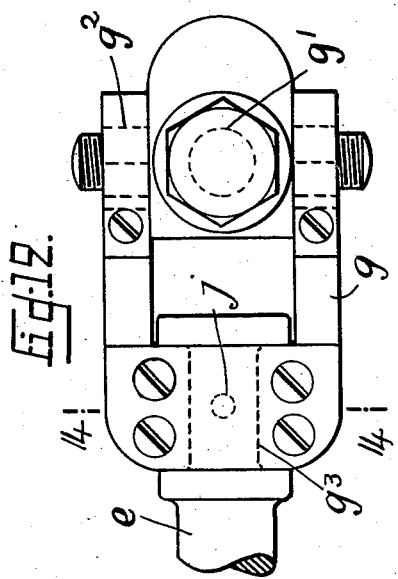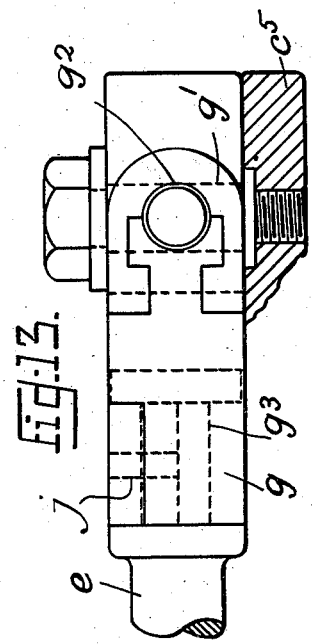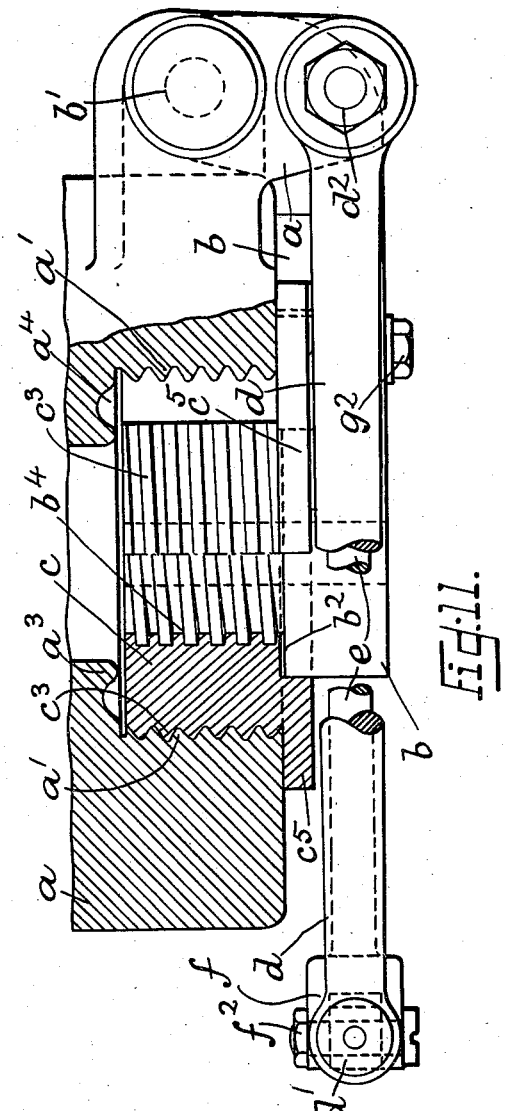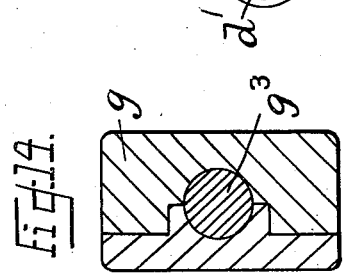

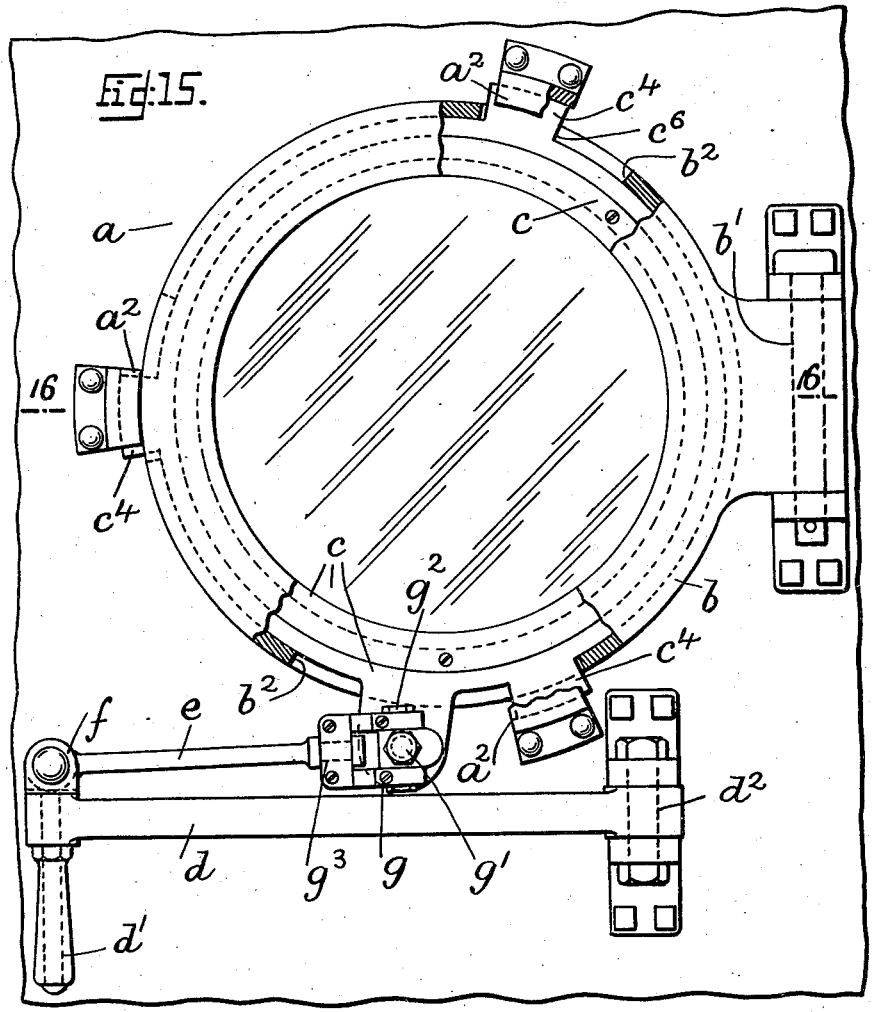
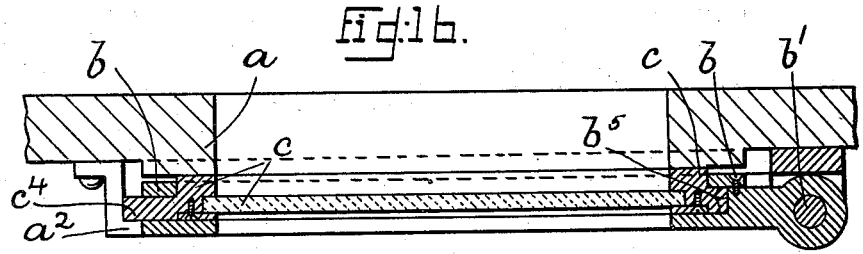

UNITED STATES PATENT OFFICE.

WALTER VILLA GILBERT, OF LONDON, ENGLAND.

CLOSING MECHANISM AND THE LIKE.

1,024,987.  Specification of Letters Patent.  Patented Apr. 30, 1912.

Application filed June 10, 1911. Serial No. 632,402.

*To all whom it may concern:*

Be it known that I, WALTER VILLA GILBERT, a subject of the King of Great Britain and Ireland, and a resident of London, England, have invented certain new and useful Improvements in Closing Mechanism and the Like; and I do hereby declare the following to be a full, clear, and exact description of the same.

This invention relates to improvements in means for transforming movement in one plane into movement in a plane lying at an angle to the first, suitable as breech closing mechanism for guns, but also suitable for other purposes, comprising a member adapted to turn in one plane and supported by a turnable carrier, a second member adapted to turn in a plane at an angle to the first, a link, and articulative means connecting the ends of the link respectively to the first and second members.

The invention has for its object to enable the mechanism to be made with considerable range of relative movement of the parts and of a practical and substantial construction, and to enable an improved action to be obtained, and particularly consists in the improved manner of connecting the link to the first and second members, as hereinafter described.

In carrying out the invention, as applied, by way of example, to closing mechanism, the latter is constructed with a member (herein called a carrier) mounted on the gun or other device so as to turn clear of the opening in the device, a member (herein called a breech-screw or a closing-piece) adapted to obstruct the opening in the device and mounted on the carrier so as to turn in a plane at an angle to the plane in which the carrier turns, a member (herein called a lever) mounted on the device or the carrier so as to turn in a plane at an angle to the plane in which the closing-piece turns, a link, and articulative means connecting one end of the link to the lever at some distance from its fulcrum and connecting the other end of the link to the closing-piece at some distance from its axis, the articulative connection at at least one end of the link being so constructed as to permit of tri-axial movement, without the use of ball-and-socket-joints, and the articulative connection at one end of the link preferably being so constructed as to permit of bi-axial movement only. By these means continuous turning of the lever in one direction is caused, firstly, to unscrew the closing-piece by turning it in one plane, and is caused, secondly, to withdraw the closing-piece axially from the opening in the device and to swing the closing-piece laterally clear of the opening by turning the carrier in another plane, and continuous turning of the lever in the opposite direction is caused to restore the parts to their closed position. In some cases where it is desired to transform movement from one plane to another, it will be obvious that the turnable carrier may be omitted, the link being connected in the manner just described.

Various modifications and applications of the invention are illustrated, by way of example, in the accompanying drawings, in which:—

Figure 2:
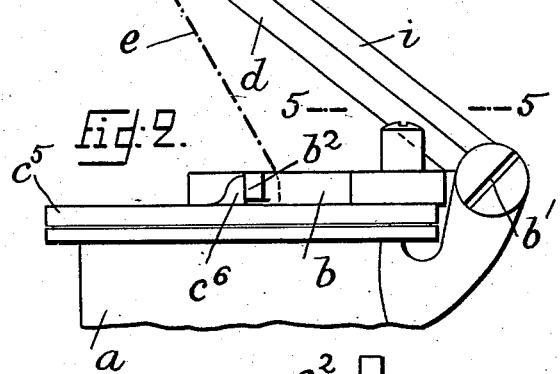
Figure 3:
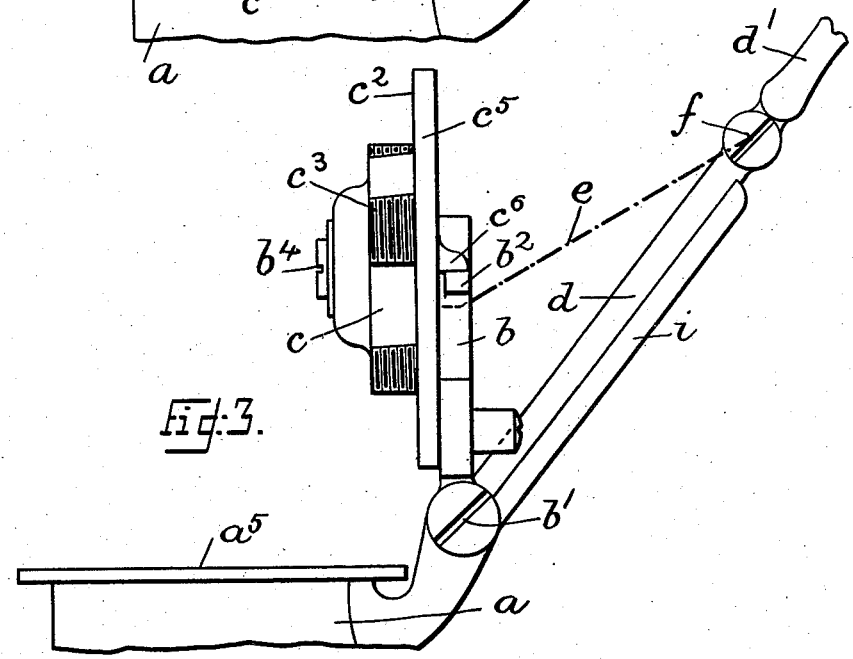

Figure 1 is a side elevation of the mouth of a receptacle of any kind adapted with closing-means according to the invention, showing the parts closed; Fig. 2 is a similar view, showing the parts in the position they occupy when the lever has been actuated to turn the closing-piece sufficiently to disengage the screw-threads and free it to enable it to be withdrawn axially from the mouth of the receptacle, the link being represented diagrammatically by a dot-and-dash line; Fig. 3 is a similar view, showing the parts in the position they occupy when the lever has been further actuated to turn the carrier on which the closing-piece is mounted sufficiently to withdraw the latter axially and swing it laterally clear of the mouth of the receptacle to an angle of 90°, but it might be swung laterally to a greater angle; Fig. 4 is a plan of Fig. 1; Fig. 5 is a sectional plan on 5—5, Fig. 2, parts being shown in dotted lines; Fig. 6 is a sectional elevation on 6—6, Fig. 4; Fig. 7 is a similar view to Fig. 1, but looking from the opposite side of the receptacle; Fig. 8 is a top plan of the mouth of the receptacle, showing the interrupted screw threads of known construction; Fig. 9 is a sectional elevation, on 9—9, Fig. 5, of a stop for interlocking the closing-piece in relation to the carrier when unscrewed; Fig. 10 is a rear elevation of a gun, parts being shown in section, adapted with closing-means according to the invention, showing the same closed; Fig. 11 is a plan, partly in section, on 11, Fig. 10; Fig. 12 is an elevation, on an enlarged scale, of a detail represented in Fig. 10; Fig. 13 is a plan thereof; Fig. 14 is a transverse section on 14—14, Fig. 12; Fig. 15 is an inner elevation, partly in section, of a ship's port-hole adapted with the improved closing means, showing the same closed; Fig. 16 is a section on 16—16, Fig. 15.

Like reference letters indicate like or equivalent parts wherever repeated in the drawings.

Referring to the drawings, $a$, represents the mouth of a receptacle of any kind, the breech of a gun, the port-hole of a ship, or other device. A carrier, $b$, is mounted on the receptacle, the gun, the hull of the ship, or other device, $a$, on an axis-pin $b^1$, so as to turn clear of the opening in the device, $a$. A closing-piece, $c$, adapted to obstruct the opening in the device, $a$, is mounted on the carrier, on an axis, $b^4$, so as to turn in a plane at an angle to the plane in which the carrier turns. The closing-piece may be formed or provided with a flange, $c^5$, suitably faced at its inner side, $c^2$, for making tight contact with the suitably faced outer end, $a^5$, of the device, $a$. Interrupted-screw-threads, $c^3$, (Figs. 3 and 6, and 11), or cam-surfaces, $c^4$, (Figs. 15 and 16) are provided on the closing-piece for engagement with complementary screw-threads, $a^1$, or cam-surfaces, $a^2$, on the device, $a$, so that when the closing-piece is turned sufficiently on its axis, $b^4$, it is free to be swung axially and laterally clear of the opening in the device, $a$.

The closing-piece may be mounted with facility of axial movement in relation to the carrier to accommodate the screwing action of the closing-piece in relation to the carrier. This may be attained by mounting the closing-piece on a plain axis, $b^4$, on the carrier (Fig. 6), or on a screwed axis, $b^4$, on the carrier (Fig. 11). Or, the closing-piece may be prevented from axial movement in relation to the carrier. This may be attained by mounting the closing-piece between opposing parts, $b^5$, on the carrier (Fig. 16). Stops, $c^6$, $b^2$ (Figs. 1 to 6, and 15), or equivalent means, are provided, preferably on the closing-piece and on the carrier, to limit the extent of unscrewing movement of the former in relation to the latter. A stop, $b^3$, or equivalent device, is provided, preferably on the carrier, adapted to co-act with an inclined-way, $c^7$, ending in a depression, $c^8$, in the flange, $c^5$, of the closing-piece, or to otherwise co-act with the closing-piece, for locking the latter to the carrier when unscrewed (Figs. 4 and 9). In Fig. 11, the screw-threaded axis, $b^4$, causes the closing-piece, $c$, to be held against the carrier, at $b^2$, when the closing-piece is unscrewed.

A lever, $d$, having a handle, $d^1$, is turnably mounted on the device or the carrier, preferably, co-axially with the axis, $b^1$, of the carrier (Figs. 1 to 8), or on an axis, $d^2$, parallel to the axis, $b^1$, (Figs. 10 and 11, and 15), so as to turn in a plane at an angle to the plane in which the closing-piece turns. Auxiliary guides $h$ (Fig. 5), integral with or connected to the carrier, $c$, or otherwise suitably mounted may be provided to aid in controlling the lever during the early part of its turning movement. A guard or flange, $i$, may be provided on the lever to prevent access of foreign matter between the guides and the lever when closed. A link, $e$, is connected by suitable articulative means, as at $f$, at one end to the lever at some distance from its fulcrum, $b^1$ (Figs. 1 to 7), or $d^2$ (Figs. 10 and 11, and 15), preferably at its end to which the actuating force is applied, and by suitable articulative means, as at $g$ (Figs. 4 and 7, 10 and 12 to 14, and 15), at the other end to the closing-piece at some distance from its axis, $b^4$. The lever and link are preferably arranged so that from the point where the link connects to the closing-piece, the link extends away from and so as not to approach the lever's fulcrum. Further, the point of connection of the link to the closing piece is preferably arranged so as to move away from the lever's fulcrum when the lever is turned away from the closing piece. The articulative connection at one end, as at $f$, preferably only permits of bi-axial movement, $f^1$ represents one axis, and $f^2$ the other, which permit of movement. The articulative connection at at least one end, as at $g$, must permit of tri-axial movement. $g^1$ represents one axis, $g^2$, a second, and $g^3$ a third, which permit of movement.

The described construction of articulative means are of advantage in being adapted to be made with facility of an increased range of relative movement of the parts and of a practical and substantial construction, which is not the case with a ball-and-socket-joint.

The manner of connecting the link to the lever and the closing-piece is a characteristic feature of the invention, and the articulative means must be of such a construction as to permit the link during part or the whole of its movement to assume different angular relations to the plane in which the lever turns.

In the operation of the mechanism:—To open the closing-piece, $c$, the lever, $d$, is turned about its fulcrum away from the device. This has the effect of causing the link, $e$, to act on the closing-piece so as to unscrew the latter. As soon as the closing-piece is sufficiently turned to disengage the screw-threads or cam-surfaces and free the closing-piece, the stops, or equivalent means, prevent further unscrewing of the closing piece and interlock it and the carrier (Fig. 2). Continued turning of the lever about its fulcrum has the effect, through the link, of turning the carrier bodily about the axis, $b^1$, and of thereby withdrawing the closing-piece clear of the opening in the part, $a$ (Fig. 3); ready for immediate closing upon reversely turning the lever.

In their normal or closed position, when the closing-piece is screwed home, the lever and the link are preferably adapted to lie in the same plane or at dead-center (Fig. 7), so that a secure locking is insured as by a completely extended toggle. In some cases, it may be arranged that, in their normal or closed position, the lever and the link lie just beyond the dead-center, so that if any force other than that due to proper actuation of the device tends to unscrew the closing-piece it causes the link to retain the lever in the closed position against the device, $a$.

The distance between the articulative connections at the ends of the link is preferably less than the distance between the articulative connection of the link to the lever, and the lever's fulcrum.

In some cases, the lever or link may be made readily disconnectible from the other parts of the closing mechanism, to render the latter inoperative when desired or prevent it from being tampered with.

A flange, $a^3$, which may be recessed as at $a^4$ (Fig. 6), may be provided around the opening of the device, $a$, for receiving packing, or, in the case of a gun, an obturator, adapted to be compressed by the closing-piece, or breech-screw, $c$, when screwed home.

In some cases, pins or other locking means may be provided to secure the parts in their closed position. For example, the articulative connection, at $g$, and the adjacent end of the link, $e$, may have holes, $j$, adapted to register when the mechanism is closed, so as to permit the insertion of a locking pin or the like.

In certain cases, the rotary movement of the closing-piece, $c$, may be adapted to cover or uncover draft or ventilating apertures in an adjacent grid or grille, as when applied to a furnace door.

What I claim as my invention and desire to secure by Letters Patent is:—

1. In means for transforming movement from one plane to another, in combination, a member adapted to turn in one plane, a lever adapted to turn in a plane at an angle to the plane in which the first member turns, a link, and articulative means connecting the link to the lever and the first member, the articulative means comprising a joint with three axes of movement, and the articulative connection of the link to the lever being situated at the end of the latter to which the actuating force is applied, substantially as described.

2. In means for transforming movement from one plane to another, in combination, a member adapted to turn in one plane, a lever adapted to turn in a plane at an angle to the plane in which the first member turns, a link, and articulative means connecting the link to the lever and the first member, the articulative means comprising a joint with three axes of movement, and the link, from the point where it connects to the first member, extending away from and so as not to approach the lever's fulcrum, substantially as described.

3. In means for transforming movement from one plane to another, in combination, a member adapted to turn in one plane, a lever adapted to turn in a plane at an angle to the plane in which the first member turns, a link, and articulative means connecting the link to the lever and the first member, the articulative means comprising a joint with three axes of movement, and the point of connection of the link to the first member being arranged so as to move away from the lever's fulcrum when the lever is turned away from the first member, substantially as described.

4. A device having an opening therein, and means for closing the opening comprising, in combination, a turnable carrier, a closing piece mounted on the carrier and adapted to turn in a plane at an angle to the plane in which the carrier turns, co-acting locking parts on the closing piece and on the device, a lever mounted so as to turn in a plane at an angle to the plane in which the closing piece turns, a link, and suitable articulative means connecting the ends of the link to the lever and the closing piece, the articulative connection of the link to the lever being situated at the end of the latter to which the actuating force is applied, substantially as described.

5. A device having an opening therein, and means for closing the opening comprising, in combination, a turnable carrier, a closing piece mounted on the carrier and adapted to turn in a plane at an angle to the plane in which the carrier turns, co-acting locking parts on the closing piece and on the device, a lever mounted so as to turn in a plane at an angle to the plane in which the closing piece turns, a link, and suitable articulative means connecting the ends of the link to the lever and the closing piece, the link from the point where it connects to the closing piece extending away and so as not to approach the lever's fulcrum, substantially as described.

6. A device having an opening therein, and means for closing the opening comprising, in combination, a turnable carrier, a closing piece mounted on the carrier and adapted to turn in a plane at an angle to the plane in which the carrier turns, co-acting locking parts on the closing piece and on the device, a lever mounted so as to turn in a plane at an angle to the plane in which the closing piece turns, a link, and suitable
5 articulative means connecting the ends of the link to the lever and the closing piece, the point of connection of the link to the closing piece being arranged so as to move away from the lever's fulcrum when the lever is turned away from the closing piece, 10 substantially as described.

In testimony whereof I affix my signature in presence of two subscribing witnesses.

WALTER VILLA GILBERT.

Witnesses:
 ALFRED DAY,
 WALTER DAY.

Copies of this patent may be obtained for five cents each, by addressing the "Commissioner of Patents, Washington, D. C."